United States Patent [19]
DeVries

[11] Patent Number: 5,082,387
[45] Date of Patent: Jan. 21, 1992

[54] PIVOT JOINT ASSEMBLY

[75] Inventor: Kevin B. DeVries, Plymouth, Wis.

[73] Assignee: Kohler Co., Kohler, Wis.

[21] Appl. No.: 667,908

[22] Filed: Mar. 12, 1991

[51] Int. Cl.$^5$ ............................................. F16C 11/00
[52] U.S. Cl. .................................. 403/146; 403/162; 403/163
[58] Field of Search ................ 403/146, 162, 161, 163

[56]        References Cited
       U.S. PATENT DOCUMENTS

| 479,329 | 7/1892 | Kolesch. | |
|---|---|---|---|
| 1,925,671 | 9/1933 | Mansfield. | |
| 2,308,475 | 1/1943 | Fawkes. | |
| 2,325,193 | 7/1943 | Nutt et al. | |
| 2,344,808 | 3/1944 | Duffield | 403/146 |
| 2,587,058 | 2/1952 | Melrose | 403/146 X |
| 2,626,156 | 1/1953 | Bergh. | |
| 3,129,597 | 4/1964 | Prior. | |
| 3,269,696 | 8/1966 | Norton. | |
| 4,135,694 | 1/1979 | Stegenga | 403/146 X |

FOREIGN PATENT DOCUMENTS

| 200793 | 11/1976 | European Pat. Off. | 403/146 |
|---|---|---|---|
| 604328 | 1/1926 | France | 403/161 |

OTHER PUBLICATIONS

Pp. 5 and 12 from untitled catalog, admitted prior art.

Primary Examiner—Andrew V. Kundrat
Attorney, Agent, or Firm—Quarles & Brady

[57]        ABSTRACT

A pivot joint for a rotary lever has a spacer extending axially from a foundation such as an engine motor component. The spacer includes a cylindrical ferrule. A rotary lever and a belleville spring, both having a bore of a size to fit over the outside of the ferrule in a sliding fit, are slid over the ferrule. The belleville spring has an uncompressed cone height to thickness ratio of 1.4 to 1.8 and is compressed by at least 50% of the uncompressed cone height. The joint also includes a means for fastening the spacer to the foundation and a means for securing the lever and belleville spring onto the ferrule. The securing means bears against the free end of the ferrule to compress the spring to provide a substantially uniform operating torque from one assembly to another.

9 Claims, 2 Drawing Sheets

FIG. 1
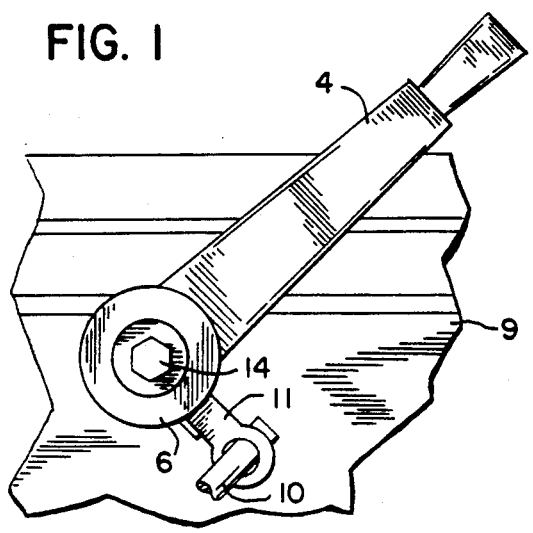
FIG. 2
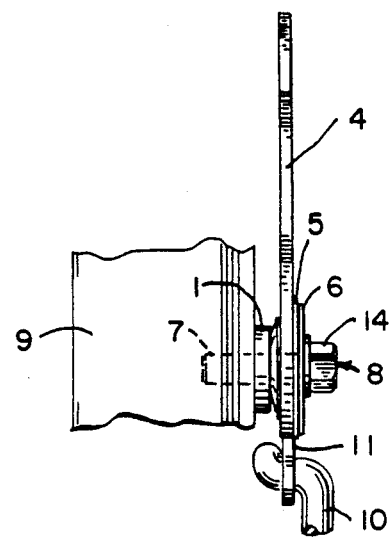
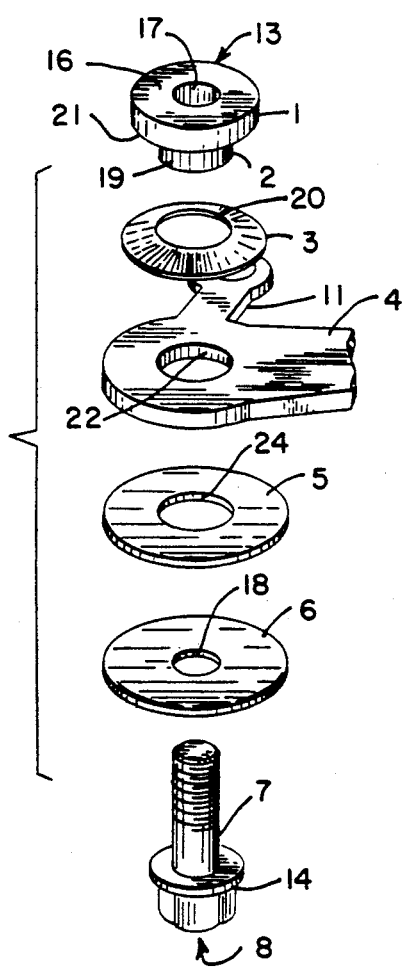
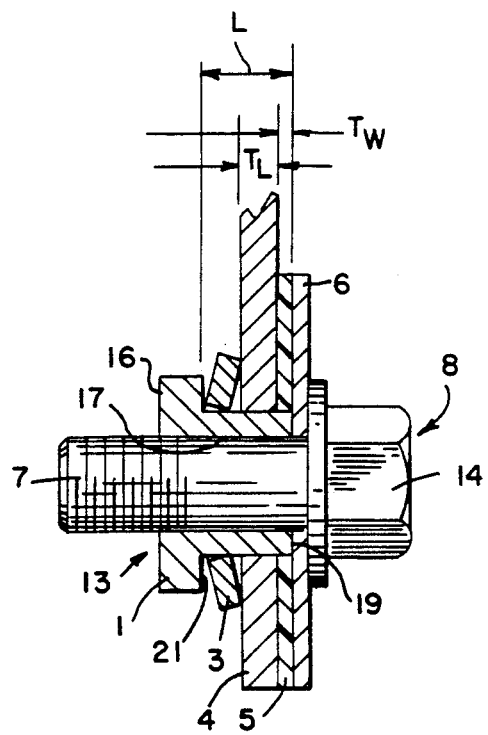
FIG. 3
FIG. 4

PIVOT JOINT ASSEMBLY

BACKGROUND OF THE INVENTION

A. Field Of The Invention

The present invention relates to pivot joints for rotary levers. It is especially suitable for use with engine speed control levers.

B. Description Of The Art

Rotary levers mounted by a pivot joint find many different applications. For example, one common application is a speed control lever mounted on a lawn mower or other power tool. A cable or other suitable means typically connects the lever to the throttle of the engine for the mower so that the mower operator can remotely adjust the mower's speed.

In these types of joints, it is typical to mount the lever so that it rotates about the shank of a connector, which fastens the lever to the mower housing or to other mounting hardware. The prior art has commonly used a rivet or a threaded fastener pair such as a nut and bolt to achieve this connection.

A drawback with prior joints of this general type is that the torque required to pivot the lever has varied greatly from assembly to assembly. Even if the component parts of the joint are within desired specifications, assembly process variables due to dimensional tolerances, hardness tolerances in rivets, and tightening torque tolerances in threaded fastener pairs result in variation of the torque from one assembly to another.

Spring washers such as "belleville" type washers have been applied in certain types of pivot connections, but even in these prior constructions, the force exerted by the spring has varied significantly with process variables. As a result, there has been greater scatter in the lever operating torque from assembly to assembly than desired.

SUMMARY OF THE INVENTION

The present invention is a pivot joint for a rotary lever. In one embodiment, this joint contains a spacer extending axially from a foundation. The spacer includes a cylindrical ferrule that has a first end and a second end. A rotary lever and a belleville spring, both having a bore of a size to fit over the outside of the ferrule in a sliding fit, are slid over the ferrule. The belleville spring has an uncompressed cone height to thickness ratio of 1.4 to 1.8 and is compressed at least 50% of the uncompressed cone height. The joint also includes a means for fastening the spacer to the foundation and a means for securing the lever and belleville spring onto the ferrule. The securing means bears against the second end of the ferrule. In this construction, the lever operating torque is uniform regardless of part variations from assembly to assembly.

In another aspect of the invention, the belleville spring is compressed nominally by 75% of the uncompressed cone height so as to optimize tolerance absorption for both loose and tight fit assemblies. Worst case tolerances of the joint can be made to result in the spring being compressed by 50–100% of its uncompressed cone height. Thereby, the spring can provide uniform axial load on the lever even under worst case joint tolerances.

In an especially useful form, the spring is dimensioned so as to reach at least 90% of its full deflection load at approximately 50% compression. When the spring is compressed by 50% to 100% of the uncompressed cone height of the spring, the load of the spring varies no more than approximately 15% of the spring's full deflection load. Thus, the operating torque from assembly to assembly is uniform to within 15%.

These and other objects and advantages of the present invention will be apparent from the description which follows. The preferred embodiment of the present invention will be described with reference to the accompanying drawings. These embodiments do not represent the full scope of the invention. Rather, the invention may be employed in other embodiments as well. Reference should therefore be made to the claims herein for interpreting the breadth of the invention.

BRIEF DESCRIPTION OF THE DRAWINGS

FIG. 1 is a side elevational view of a lever assembly incorporating a pivot joint of the invention;

FIG. 2 is a front plan view of the lever assembly of FIG. 1;

FIG. 3 is an exploded perspective view (partially fragmented) of the pivot joint assembly incorporated in the lever assembly of FIGS. 1 and 2;

FIG. 4 is a detail sectional view of the pivot joint assembly;

DESCRIPTION OF THE PREFERRED EMBODIMENT

Figure 5:
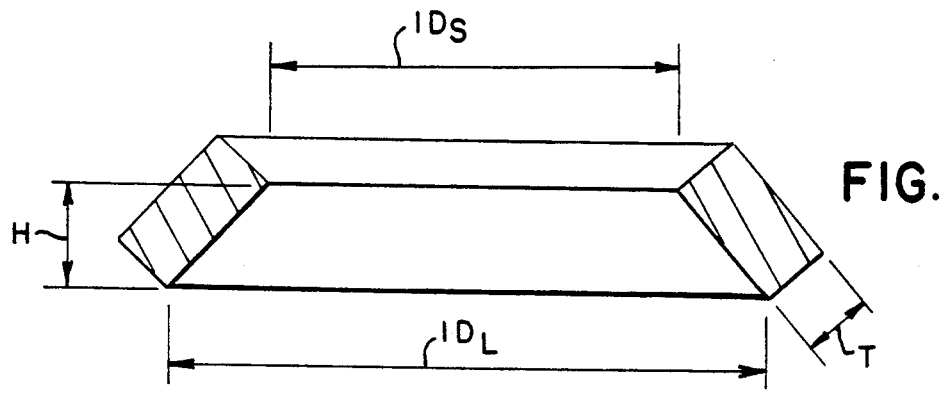
FIG. 5 is a sectional view illustrating a belleville spring for the pivot joint assembly (in an uncompressed state)

FIGS. 1, 2, 3 and 4 depict seven components of a preferred embodiment of the invention. These components are a spacer 13, a belleville spring 3, a lever 4, an anti-friction washer 5, a thrust washer 6, a fastener 8, and a foundation 9. The foundation 9, for example, could be a handle or other mounting component for a power tool such as a lawn mower, and the lever could be the speed control lever or other operating lever for the tool, for example, having a tail portion 11 with a hole 11a therethrough to receive the Z-bend of a control rod 10 in conventional fashion.

The spacer 13, having a flange 1 and an integral ferrule 2, abuts and extends in an axial direction from the foundation 9. An end face 16 of the spacer 13 is held against the foundation 9 by the fastener 8. The fastener 8 has a shank 7 which extends through an axial bore 17 of the spacer 13 and is threaded into the foundation 9.

The thrust washer 6 has a bore 18 large enough to slip over the shank 7 of the fastener 8 but too small to slip over end 19 of the ferrule 2. The belleville spring 3, the lever 4, and the anti-friction washer 5 each have a bore 20, 22 and 24, respectively, that allows the elements to slide over the ferrule 2 in a clearance fit. When the fastener 8 is tightened, head 14 of the fastener 8 bears against the thrust washer 6 and the thrust washer 6 compresses the belleville spring 3, lever 4, and anti-friction washer 5 within the pilot height provided between annular face 21 of flange 1 and end 19 of the ferrule 2. The thrust washer 6 bears on the end 19 of the ferrule 2 by the load generated by the fastener 8 tightened into the foundation 9.

The belleville spring 3 in the preferred embodiment has a cone height to thickness ratio of approximately 1.5, which imparts favorable characteristics to the spring as used in the present invention. The uncompressed cone height of the belleville spring 3 is defined in FIG. 5 by dimension H. The spring thickness is defined in FIG. 5 by dimension T. The small and large inside diameters of the spring, $ID_S$ and $ID_L$, are defined in FIG. 5. In the preferred embodiment, the uncompressed belleville spring has an $ID_S$ of 0.45 inches and an $ID_L$ of 0.81 inches.

For the belleville spring 3 having a cone height H to thickness T ratio of 1.5, the spring reaches 95% of its fully deflected load level at approximately 50% deflection. The fully deflected load level is defined as the load level of a 100% deflected spring. The load varies from about 95% to 105% of the fully deflected load level between the deflection values of 50–100%. Therefore, if the belleville spring 3 is deflected by any amount in the range of 50–100% of the uncompressed height H, the spring provides tolerance absorption for itself, the lever 4, the anti-friction washer 5, and the ferrule 2 without varying the axial load exerted on the lever 4 by more than about 10%.

Belleville springs that have H/T ratios of between approximately 1.4 and 1.8 are preferably used in practicing the present invention. Between 50–100% deflection, the load these springs exert will vary by less than about 15% of the full deflection load of the spring and will provide tolerance absorption without significantly varying the axial load exerted on the lever 4.

Figure 6:
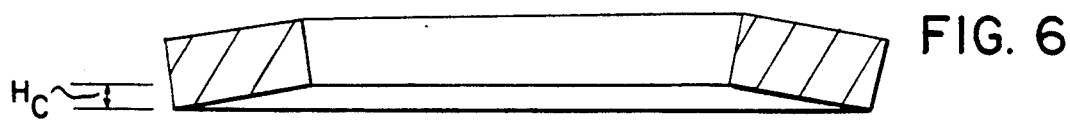
FIG. 6 is a view similar to FIG. 5 but showing the spring compressed by 75% of the uncompressed cone height of the spring.

Therefore, it is preferred to nominally size the length of the ferrule 2, from the annular face 21 to end 19, and the thicknesses of the lever 4 and washer 5, to compress the belleville spring 3 by approximately 65% to 75% of the uncompressed cone height H when the thrust washer 6 is abutted against end 19 by fastener 8. This degree of compression is depicted in FIG. 6, where the compressed cone height, designated $H_c$, is approximately equal to 25% of the uncompressed height H ($H_c \simeq 0.25$ H) depicted in FIG. 5.

Tolerances of the length of the ferrule 2, the thicknesses of the lever 4, the washer 5, and the spring 3, and the uncompressed height of the spring 3 are specified to stay within the range of 50–100% deflection of the spring 3. For example, in the preferred embodiment, the nominal length L of the ferrule 2 is 0.1405 inches long, the nominal thickness $T_W$ of the washer 5 is 0.0378 inches, the nominal thickness $T_L$ of the lever 4 is 0.0722 inches, the nominal thickness T of the spring 3 is 0.0200 inches, and the nominal uncompressed height H of the spring 3 is 0.031 inches. The dimensions L, $T_W$ and $T_L$ are defined in FIG. 4. Thus, applying the relation $100\{1-(L-T_W-T_L-T)/H\}$ to determine the degree of compression, it is seen that the spring 3 is compressed by 66% in the embodiment disclosed.

In the preferred embodiment the tolerance $X_F$ on the length L of the ferrule 2 is ±0.0025 inches, the tolerance $X_W$ on the thickness of the washer 5 is ±0.0016 inches, the tolerance $X_L$ on the thickness of the lever 4 is ±0.0025 inches, the tolerance $X_S$ on the thickness of the spring 3 is ±0.0010 inches, and the tolerance $X_H$ on the uncompressed height H of the spring 3 is ±0.0030 inches.

At 66% nominal deflection, the tolerances of the parts can vary the deflection of the spring 3 by −16% (i.e., 0.16×(0.031−0.003)=0.0045) to +34% (i.e., 0.34×(0.031−0.003)=0.0095). Applying a root-mean-square analysis to the tolerances of the spring 3, the lever 4, the washer 5 and the ferrule 2 as follows $\pm\sqrt{X_X+X_L+X_W+X_F}$ yields a total RMS tolerance of ±0.004 inches, which is within the allowable 0.0045 inch deviation on the low side and the allowable 0.0095 inch deviation on the high side.

The worst case at the high end of the deflection range in the preferred embodiment disclosed is approximately 80% deflection. Note that it is preferred to stay as far below 100% deflection as possible at the high end of the deflection range with worst case tolerances. One reason for this is to avoid unstable behavior the spring may exhibit above approximately 97% deflection. Another reason is to insure that the thrust washer 6 is positively abutted against the end 19, rather than tightly clamping the washer 5, lever 4 and spring 3 against surface 21 of flange 1.

Figure 7:
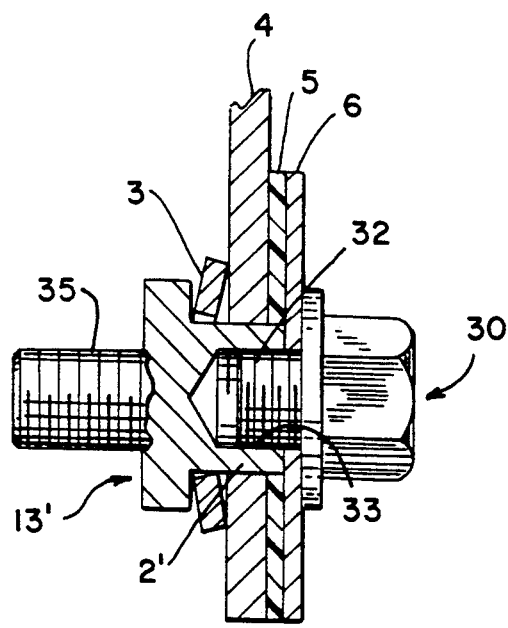
FIG. 7 is a detail sectional view of an alternate embodiment of a pivot joint assembly of the invention.

Other combinations of elements are possible in the claimed invention. FIG. 7 illustrates such an alternative embodiment. In FIG. 7, a fastener 30 has a threaded end 32 that fits within a threaded bore 33 in a ferrule 2'. A spacer 13' has a threaded shank 35 that fits into a threaded bore in the foundation 9. The embodiment shown in FIG. 7 has the thrust washer 6 and the anti-friction washer 5, but either of these elements may be omitted in other embodiments or could be made integral parts of the fastener and/or lever.

Preferred embodiments of the invention have been described. However, numerous modifications and variation to the preferred embodiments will be apparent to those of ordinary skill in the art. For example, the order the components are arranged on the ferrule 2 may be changed and still be within the spirit and scope of the invention. Therefore, the invention should not be limited to the scope of the foregoing description and drawings, but should be defined by the claims which follow.

I claim:

1. A pivot joint assembly for a rotary lever, comprising:

a foundation;

a spacer extending from said foundation along an axial direction and including a cylindrical ferrule extending between a first end and a second end along a length in said axial direction, said ferrule being of an outer diameter at its second end;

a rotary lever having a thickness along said axial direction and a length extending radially from said axial direction, said lever having a through bore in said axial direction, said bore being of a diameter to fit over said outer diameter of the ferrule in a sliding fit;

a belleville spring having an outside diameter, a bore of an inside diameter, a thickness, and an uncompressed cone height, with a ratio of uncompressed cone height to thickness being between 1.4 and 1.8, said bore inside diameter being of a size to fit over said outer diameter of the ferrule in a sliding fit;

means for fastening said spacer to said foundation with said second end of said ferrule distal to said foundation and said first end proximal to said foundation; and means for securing said lever and said belleville spring on said ferrule with said ferrule extending through the bores of said lever and spring so that said securing means exerts a force against the second end of the ferrule;

wherein when the assembly is assembled with said spring and lever received on said ferrule and said securing means exerting a force against the second end of the ferrule, the belleville spring is compressed by an amount equal to at least 50% of the uncompressed cone height of said belleville spring.

2. A pivot joint as in claim 1, wherein said belleville spring is compressed nominally by at least approximately 65% of the uncompressed cone height of said belleville spring.

3. A pivot joint as in claim 1, wherein worst case root-mean-square total tolerances of the joint result in the spring being compressed by 50-100% of its total deflection.

4. A pivot joint as in claim 1, wherein said spacer has a bore throughout said axial length and wherein a fastener, having an axial extension of an outer diameter sufficiently small enough to fit through said spacer bore, provides both the fastening and securing means.

5. A pivot joint as in claim 4, wherein said securing means further comprises a thrust washer having an axial thickness and an axial bore through said thickness, said thrust washer bore being of a diameter large enough to fit over the outer diameter of said fastener in a sliding fit but too small to fit over the outer diameter of said ferrule, and wherein said thrust washer is sandwiched between a head of said fastener and the second end of said ferrule.

6. A pivot joint as in claim 1, further comprising an anti-friction washer having an axial thickness and a bore throughout said axial thickness, said bore being of a diameter to fit over said outer diameter of said ferrule in a sliding fit, and said antifriction washer being received on said ferrule adjacent to said lever.

7. A pivot joint as in claim 1, wherein said belleville spring is dimensioned so as to reach at least 90% of its full deflection load at approximately 50% compression, and wherein the load of said spring varies by no more than approximately 15% of said spring's full deflection load when said spring is compressed by 50% to 100% of the uncompressed cone height of the spring.

8. A pivot joint as in claim 1, wherein said spacer has an integrally formed flange at the first end of said ferrule, the radial dimension of said flange being larger than said outer diameter of the ferrule.

9. A pivot joint as in claim 8, wherein said flange bears against said foundation.

* * * * *